US00RE40197E

(19) United States
(12) Reissued Patent
Ray et al.

(10) Patent Number: US RE40,197 E
(45) Date of Reissued Patent: Apr. 1, 2008

(54) DRILL BIT HAVING AN IMPROVED SEAL AND LUBRICATION METHOD USING SAME

(75) Inventors: Thomas Wayne Ray, Tyler, TX (US); James Edward Boyce, Cedar Hill, TX (US)

(73) Assignee: Halliburton Energy Services, Inc., Dallas, TX (US)

(21) Appl. No.: 11/701,948

(22) Filed: Feb. 2, 2007

Related U.S. Patent Documents

Reissue of:
(64) Patent No.: 7,013,998
Issued: Mar. 21, 2006
Appl. No.: 10/717,742
Filed: Nov. 20, 2003

(51) Int. Cl.
*E21B 10/22* (2006.01)

(52) U.S. Cl. ..... 175/371; 175/372
(58) Field of Classification Search ..... 175/371, 175/372
See application file for complete search history.

(56) References Cited

U.S. PATENT DOCUMENTS

| | | | |
|---|---|---|---|
| 3,879,044 | A | 4/1975 | Estes |
| 4,761,447 | A | 8/1988 | Shen et al. |
| 4,839,221 | A | 6/1989 | Asaumi et al. |
| 4,851,068 | A | 7/1989 | Uyehara |
| 5,134,170 | A | 7/1992 | Ohata et al. |

(Continued)

FOREIGN PATENT DOCUMENTS

| | | | |
|---|---|---|---|
| CN | 12189812 | * | 4/2001 |
| DE | 100 59 237 A1 | * | 6/2002 |
| EP | 1 211 282 A1 | * | 6/2002 |
| JP | 11-293089 | * | 10/1999 |
| JP | 2001-158849 | * | 6/2001 |
| JP | 2004-075707 | * | 3/2004 |
| JP | 2004-132486 | * | 4/2004 |
| JP | 2004-148634 | * | 5/2004 |
| WO | WO 98/10012 | * | 3/1998 |
| WO | WO 02/079308 A1 | * | 10/2002 |
| WO | WO 03/072646 A1 | * | 9/2003 |
| WO | WO 2005/014708 A1 | | 2/2005 |

OTHER PUBLICATIONS

MSDS for Zinc Oxide KADOX–911. <http://www.hmroyal.com/pdf%5CZincCorp%5CZinc–Kadox%20911C%20Zinc%20Oxide–ZO01108.pdf>, pp. 1–5.

Zinc Corporation of America ZCA. KADOX–911 (Zinc Oxide). <http://www.thecarycompany.com/adobe/ZCA/kadox911–data.pdf>.

Ciullo, P.S. (1996), Industrial Minerals and Their Uses—A Handbook and Formulary. (pp. 221–222, 231–235). William Andrew Publishing/Nyes. Online version availabel at <http://www.knovel.com/knovel2/Toc.jsp?BookID=389&VerticalID+0>.

EPO abstract and computer translation for DE 10059237.

(Continued)

*Primary Examiner*—William P Neuder
(74) *Attorney, Agent, or Firm*—Lawrence R. Youst; Patton Boggs LLP

(57) ABSTRACT

A drill bit (100) for drilling a wellbore that traverses subterranean formations includes a drill bit body (106) having a plurality of journal pins (112), each having a bearing surface (128), and a rotary cutter (104) rotatably mounted on each journal pin (112), each rotary cutter (104) including a bearing surface (126). A pressure-compensated reservoir (130) is in fluid communication with the bearing surfaces (126, 128) and has a lubricant therein. A seal element (144) is positioned between each journal pin (112) and rotary cutter (104) and retains the lubricant in the bearing surfaces (126, 128). The seal element (144) is formed from a nanocomposite material including a polymer host material and a plurality of nanostructures.

35 Claims, 5 Drawing Sheets

U.S. PATENT DOCUMENTS

| | | | | | |
|---|---|---|---|---|---|
| 5,169,887 | A | * | 12/1992 | Snow et al. | |
| 5,323,863 | A | | 6/1994 | Denton | |
| 5,385,984 | A | * | 1/1995 | Blohm et al. | |
| 5,459,202 | A | | 10/1995 | Martinez et al. | |
| 5,524,718 | A | | 6/1996 | Kirk et al. | |
| 5,552,469 | A | * | 9/1996 | Beall et al. | |
| 5,578,672 | A | * | 11/1996 | Beall et al. | |
| 5,668,203 | A | | 9/1997 | Badesha et al. | |
| 5,698,624 | A | * | 12/1997 | Beall et al. | |
| 5,721,306 | A | * | 2/1998 | Tsipursky et al. | |
| 5,760,121 | A | * | 6/1998 | Beall et al. | |
| 5,804,613 | A | * | 9/1998 | Beall et al. | |
| 5,830,528 | A | * | 11/1998 | Beall et al. | |
| 5,840,796 | A | | 11/1998 | Badesha et al. | |
| 5,844,032 | A | * | 12/1998 | Serrano et al. | |
| 5,849,830 | A | * | 12/1998 | Tsipursky et al. | |
| 5,877,248 | A | * | 3/1999 | Beall et al. | |
| 5,880,197 | A | * | 3/1999 | Beall et al. | |
| 5,952,095 | A | * | 9/1999 | Beall et al. | |
| 5,962,553 | A | | 10/1999 | Ellsworth | |
| RE36,452 | E | * | 12/1999 | Upton et al. | |
| 5,998,528 | A | * | 12/1999 | Tsipursky et al. | |
| 6,034,164 | A | * | 3/2000 | Elspass et al. | |
| 6,050,509 | A | * | 4/2000 | Clarey et al. | |
| 6,057,396 | A | * | 5/2000 | Lan et al. | |
| 6,083,559 | A | * | 7/2000 | Beall et al. | |
| 6,090,734 | A | * | 7/2000 | Tsipursky et al. | |
| 6,107,387 | A | * | 8/2000 | Kaylo et al. | |
| 6,123,337 | A | * | 9/2000 | Fang et al. | |
| 6,124,365 | A | * | 9/2000 | Lan et al. | |
| 6,126,734 | A | * | 10/2000 | Beall et al. | |
| 6,225,394 | B1 | * | 5/2001 | Lan et al. | |
| 6,228,903 | B1 | * | 5/2001 | Beall et al. | |
| 6,232,388 | B1 | * | 5/2001 | Lan et al. | |
| 6,235,533 | B1 | * | 5/2001 | Tsipursky et al. | |
| 6,242,500 | B1 | * | 6/2001 | Lan et al. | |
| 6,251,980 | B1 | * | 6/2001 | Lan et al. | |
| 6,262,162 | B1 | * | 7/2001 | Lan et al. | |
| 6,362,279 | B2 | * | 3/2002 | Lichtenhan et al. | |
| 6,376,591 | B1 | * | 4/2002 | Lan et al. | |
| 6,387,996 | B1 | * | 5/2002 | Lan et al. | |
| 6,391,449 | B1 | * | 5/2002 | Lan et al. | |
| 6,399,690 | B2 | * | 6/2002 | Lan et al. | |
| 6,407,155 | B1 | * | 6/2002 | Qian et al. | |
| 6,461,423 | B1 | * | 10/2002 | Beall et al. | |
| 6,462,122 | B1 | * | 10/2002 | Qian et al. | |
| 6,536,542 | B1 | * | 3/2003 | Fang et al. | 175/371 |
| 6,554,070 | B2 | * | 4/2003 | Chavez et al. | |
| 6,746,627 | B2 | | 6/2004 | Niu et al. | |
| 6,844,036 | B2 | | 1/2005 | Apostolo et al. | |
| 7,013,998 | B2 | | 3/2006 | Ray et al. | |
| 7,022,773 | B2 | | 4/2006 | Albano et al. | |
| 2002/0052434 | A1 | * | 5/2002 | Lichtenhan et al. | |
| 2002/0055581 | A1 | * | 5/2002 | Lorah et al. | |
| 2002/0161119 | A1 | | 10/2002 | Obrecht et al. | |
| 2003/0039816 | A1 | * | 2/2003 | Wang et al. | |
| 2003/0050354 | A1 | | 3/2003 | Gilman et al. | |
| 2003/0187124 | A1 | * | 10/2003 | Hirata et al. | |
| 2004/0122155 | A1 | | 6/2004 | Pazur | |
| 2004/0135292 | A1 | | 7/2004 | Coats et al. | |
| 2005/0109502 | A1 | * | 5/2005 | Buc Slay et al. | 166/179 |
| 2005/0161212 | A1 | | 7/2005 | Leismer et al. | |

OTHER PUBLICATIONS

Buc Slay et al.; "What Engineers Need to Know About Seals and Sealing Technology"; Energy Rubber Group—2003 Fall Technical Symposium; Sep. 16, 2003; pp. 1–24.*

Alexander Galezewski et al.; "Thermosetting Cellular Elastomers Reinforced with Carbon Black and Silica Nanoparticles", Journal of Elastomers and Plastics; vol. 33; Jan. 2001; pp. 13–33.*

"Polymer Preprints"; Division of Polymer Chemistry, Inc.; American Chemical Society; vol. 42, No. 2; Fall 2001; pp. 885–886.*

Michele Vacatello; "Molecular Arrangements in Polymer–Based Nanocomposites"; Macromol Theory Simul. 2002, 11, No. 7; pp. 757–765.*

"Nanomaterials—A Big Market Potential"; Chemical Week; Oct. 16, 2002; pp. 17–20.*

"Organic/Inorganic Hybrid Polymer/Clay Nanocomposites"; NASA Tech Briefs; Dec. 2003; p. 21.*

Prof. E.P. Giannelis; "Polymer Nanocomposites"; Cornell University; p. 1–2.*

Siby Varghese et al.; "Rubber Nanocomposites via Solutions and Melt Intercalation"; Presented at a meeting of the Rubber Division, American Chemical Society; Paper No. 43A; Oct. 14–17, 2003; pp. 1–24.*

L.A. Goettler et al.; "Layered Silicate Nanocomposites Comprising Rubbery Polymer Matrices"; Presented at the meeting of the Rubber Division, American Chemical Society; Paper No. 41; Oct. 14–17, 2003; 9 pages.*

Susmita Sadhu et al.; "Acrylonitrile Butadiene Rubber Based Nanocomposites: Preparation and Mechanical Properties"; Presented at a meeting of the Rubber Division, American Chemical Society: Paper No. 42; Oct. 14–17, 2003; pp. 1–12.*

Abhijit Bandyopadhyay et al.; "Synthesis and Characterization of Acrylic Rubber/Silica Nanocomposites by Sol–Gel Technique"; Presented at a meeting of the Rubber Division, American Chemical Society; Paper No. 43; Oct. 14–17, 2003; pp. 1–20.*

Liming Dai et al.; "Polymer and Aligned Carbon Nanotube Nanocomposites"; Presented at a meeting of the Rubber Division, American Chemical Society; Paper No. 39; Oct. 14–17, 2003; pp. 1–14.*

Arnab Sarkar et al.; "An Analysis of the Microscopic Deformation Field in Rubbers Filled with Nono–Particles"; Presented at a meeting of the Rubber Division, American Chemical Society; Paper No. 40; Oct. 14–17, 2003; 17 pages.*

Shannon M. Lloyd et al.; "Life Cycle Economic and Environmental Implications of Using Nanocomposites in Automobiles"; ACS Publications; Apr. 28, 2003; pp. 3458–3466.*

Suprakas Sinha Ray et al.; "New Polylactide/Layered Silicate Nanocomposites"; Macromolecules; Jan. 15, 2002; pp. 3104–3110.*

Bo–Hyun Kim et al.; "Nanocomposite of Polyaniline and Na+—Montmorillonite Clay"; Macromolecules; Oct. 10, 2001; pp. 1419–1423.*

Joo Young Nam et al.; "Crystallization Behavior and Morphology of Biodegradable Polylactide/Layered Silicate Nanocomposite"; ACS Publications; Jul. 27, 2003; 1 page.*

Peter C. LeBaron et al.; "Clay Nanolayer Reinforcement of a Silicone Elastomer"; ACS Publications; Jun. 26, 2001; 1 page.*

Christophe Danumah et al.; "Novel Polymer Nanocomposites from Templated Mesostructured Inorganic Materials"; Macromolecules; Apr. 14, 2003; pp. 8208–8209.*

Horng–Long Tyan et al.; "Thermally and Mechanically Enhanced Clay/Polyimide Nanocomposite via Reactive Organoclay"; ACS Publications; May 11, 1999; 1 page.*

Horng–Long Tyan et al.; "Effect of Reactivity of Organics–Modified Montmorillonite on the Thermal and Mechanical Properties of Montmorillonite/Polyimide Nanocomposites"; ACS Publications; Oct. 24, 2000; 1 page.*
Jeffrey W. Gilman et al.; "Flammability Properties of Polymer–Layered–Silicate Nanocomposites. Polypropylean and Polystyrene Nanocomposites"; ACS Publications; May 8, 2000; 2 pages.*
Jeffrey W. Gilman et al.; "Polymer/Layered Silicate Nanocomposites from Thermally Stable Trialkylimidazolium–Treated Montmorillonite"; ACS Publications; Mar. 29, 2002; 1 page.*
Benedicte Lepoittevin et al.; "Poly (–caprolactone)/Clay Nanocomposites by in–Situ Intercalative Polymerization Catalyzed by Dibutyltin Dimethoxide"; Macromolecules; Aug. 2, 2002; pp. 8385–8390.*
Pascal Viville et al.; "Surface Characterization of Poly (–caprolactone)–Based Nanocomposites"; Langmuir, Jul. 14, 2003; pp. 9425–9433.*
Bret J. Chisholm et al.; "Nanocomposites Derived from Sulfonated Poly (butylene terephthalate)"; Macromolecules; Dec. 21, 2001; pp. 5508–5516.*
J.E. Mark; "Some Recent Theory, Experiments, and Simulations on Rubberlike Elasticity", ACS Publications; Aug. 6, 2002; 1 page.*
Francis W. Starr et al.; "Molecular Dynamics Simulation of a Polymer Melt with a Nanoscopic Particle"; Macromolecules; Dec. 3, 2001; pp. 4481–4492.*
Yuqin Li et al.; "A differential Scanning Calorimetry Study of the Assembly of Hexadecylamine Molecules in the Nanoscale Confined Space of Silicate Galleries"; ACS Publications; Dec. 21, 2001; 1 page.*
Q.H. Zeng et al.; "Molecular Dynamics Simulation of Organic–Inorganic Nanocomposites; Layering Behavior and Interlayer Structure of Organoclays"; ACS Publications; Oct. 6, 2003; 1 page.*
S. Joly et al.; "Organically Modified Layered Silicates as Reinforcing Fillers for Natural Rubber"; ACS Publications; Jun. 14, 2002; 1 page.*
Cynthia A. Mitchell et al.; "Dispersion of Functionalized Carbon Nanotubes in Polystyrene"; Macromolecules; Jun. 10, 2002; pp. 8825–8830.*
"Buckytube Properties & Uses"; Carbon Nanotechnologies Incorporated; 1 page.*
"General Information About Nanomers"; Nanocor; 2 pages.*
"Polymer Benefits"; Nanocors; 2 pages.*
"Nanoclays for Plastics"; Elementis Specialties; 1 page.*
"About Bentonite"; Laviosa Chimica Mineraria; 1 page.*
"Carbon Nanotubes: A Small–Scale Wonder"; Newsfront; Feb. 2003; 2 pages.*
Daniel T. Colbert; "Single–wall nanotubes: a new option for conductive plastics and engineering polymers"; Plastics Additives & Compounding; Jan./Feb. 2003; 7 pages.*
Tie Lan et al.; "Applications of Nanomer in Nanocomposites: From Concept to Reality"; Nanocor; Jun. 25–27, 2001; 10 pages.*
"Hybrid Plastics"; POSS Nanotechnology Conference 2002; Sep. 2002; 58 pages.*
Donald Bansleban; "Nanostructured Materials: Commercial Applications and Horizons"; POSS Nanotechnology Conference 2002; Sep. 2002; 1 page.*
Rohit Shukla; "California's Nanotechnology Republic"; POSS Nanotechnology Conference 2002; Sep. 2002; 1 page.*
Shashi, Jasy; R&D Markets for POSS Nanomaterials; POSS Nanotechnology Conference 2002; Sep. 2002; 1 page.*
Shawn Phillips; "AFRL POSS Applications Research"; POSS Nanotechnology Conference 2002; Sep. 2002; 1 page.*
Baudilio Tejerina et al.; "POSS–Versatile Materials for Scientific & Technological Applications"; POSS Nanotechnology Conference 2002; Sep. 2002; 1 page.*
John Kieffer; "Multiscale Simulation of POSS Nano–Assembly"; POSS Nanotechnology Conference 2002; Sep. 2002; 1 page.*
Erik Abbenhuis; "Homogeneous and Heterogeneous Catalysis with POSS"; POSS Nanotechnology Conference 2002; Sep. 2002; 1 page.*
Stephanie L. Wunder et al.; "POSS Materials as Platforms for Synthesis of Novel Electrolytes for Lithium Batteries"; POSS Nanotechnology Conference 2002; Sep. 2002; 1 page.*
Leland Vane; "Membrane Technology"; POSS Nanotechnology Conference 2002; Sep. 2002; 1 page.*
Jack Sammons; "Gass Permeability & Gas Separation Usine POSS Materials"; POSS Nanotechnology Conference 2002; Sep. 2002; 1 page.*
Rene Gonzalez; "POSS Research Efforts with AFRL"; POSS Nanotechnology Conference 2002; Sep. 2002; 1 page.*
Jeffrey Gilman; "Development of High Throughput Methods for Nanocomposite Materials Research"; POSS Nanotechnology Conference 2002; Sep. 2002; 1 page.*
Andre Le; "Applications of POSS In Thermosetting Polymers and Composites"; POSS Nanotechnology Conference 2002; Sep. 2002; 1 page.*
M. Azam Ali et al.; "Nanocomposite resists for Next Generation Lithography (NGL)"; POSS Nanotechnology Conference 2002; Sep. 2002; 1 page.*
Lucie Robitaille et al.; "POSS Technology For Improved Adhesives In Telecommunications Applications"; POSS Nanotechnology Conference 2002; Sep. 2002; 1 page.*
David A. Schiraldi et al.; "Reinforcement of PET with POSS"; POSS Nanotechnology Conference 2002; Sep. 2002; 1 page.*
Masanori Ikeda; "Utilization of POSS in Industrial Applications"; POSS Nanotechnology Conference 2002; Sep. 2002; 1 page.*
Gregg Zank; "The Chemistry of Hydrogen–octasilsessquioxane: The Preparation of Characterization of Octasilsesquioxane Containing Polymers"; POSS Nanotechnology Conference 2002; Sep. 2002; 1 page.*
Richard Laine et al.; "Silsequoloxane Nanocomposites and Phenylsilsesquioxane Derivatives"; POSS Nanotechnology Conference 2002; Sep. 2002; 1 page.*
Bryan Coughlin; "POSS—Polyolefin Nanocomposites"; POSS Nanotechnology Conference 2002; Sep. 2002; 1 page.*
Charles U. Pittman, Jr.; "Chemical Incorporation of POSS Derivatives into Crosslinked Polymer Matrices"; POSS Nanotechnology Conference 2002; Sep. 2002; 1 page.*
Rusty Blanski; "Synthesis and Characterization of Lubricants Based on POSS Technology"; POSS Nanotechnology Conference 2002; Sep. 2002; 1 page.*
Mark Banasak–Holl; "POSS Surface Science and Applications to Non–Linear Electronic Devices"; POSS Nanotechnology Conference 2002; Sep. 2002; 1 page.*
Scott Schricker et al.; "POSS in Dental Composites and Adhesives"; POSS Nanotechnology Conference 2002; Sep. 2002; 1 page.*
Patrick Mather; "Amphiphillc POSS Telechelics"; POSS Nanotechnology Conference 2002; Sep. 2002; 1 page.*

Alan Esker; "Interfacial Properties of Amphiphilic POSS derivatives"; POSS Nanotechnology Conference 2002; Sep. 2002; 1 page.*
Adam Strachota; "POSS Reinforced Epoxy Systems"; POSS Nanotechnology Conference 2002; Sep. 2002; 1 page.*
V. Bellas et al.; "First Results on the Lithographic Evaluation of New POSS Containing 157nm Photoresists"; POSS Nanotechnology Conference 2002; Sep. 2002; 6 pages.*
Junchao Huang et al.; Preparation and Properties of Polyimide–POSS Nanocomposites; POSS Nanotechnology Conference 2002; Sep. 2002; 6 pages.*
Guirong Pan et al.; "Combining POSS with Dendrimers and High–Performance Thermoplastics"; POSS Nanotechnology Conference 2002; Sep. 2002; 11 pages.*
Patrick Ruth; "Effects on Processing by Drop–in Modifiers in Nano–Composite Polymers"; POSS Nanotechnology Conference 2002; Sep. 2002; 10 pages.*
Brian Moore et al.; "POSS Polystyrene Copolymers Reactivity and Control"; POSS Nanotechnology Conference 2002; Sep. 2002; 12 pages.*
Michael T. Hay et al.; "Synthesis and Characterization of a Novel Iron (III) Silsequioxane Compound"; POSS Nanotechnology Conference 2002; Sep. 2002; 6 pages.*
Joseph Lichtenhan; Introduction and Welcom; POSS Nanotechnology Conference 2002; Sep. 2002; 2 pages.*
Donald Bansleben; "Nanostructured Materials: Commercial Applications and Horizons"; POSS Nanotechnology Conference 2002; Sep. 2002; 15 pages.*
Rohit Shukla; "California's Nanotechnology Republic"; POSS Nanotechnology Conference 2002; Sep. 2002; 8 pages.*
Shashi Jasty; "R&D Markets for POSS Nanomaterials"; POSS Nanotechnology Conference 2002; Sep. 2002; 13 pages.*
Shawn Phillips; "AFRL POSS Nanomaterials"; POSS Nanotechnology Conference 2002; Sep. 2002; 20 pages.*
Baudilio Tejerina; "POSS—Versatile Materials for Scientific & Technological Applications"; POSS Nanotechnology Conference 2002; Sep. 2002; 14 pages.*
John Kieffer; "Multiscale Simulation of POSS Nano–Assembly"; POSS Nanotechnology Conference 2002; Sep. 2002; 19 pages.*
Erik Abbenhuis; "Homogeneous and Heterogeneous Catalysis with POSS"; POSS Nanotechnology Conference 2002; Sep. 2002; 17 pages.*
Stephanie L. Wunder; "POSS Materials as Platforms for Synthesis of Novel Electrolytes for Lithium Batteries"; POSS Nanotechnology Conference 2002; Sep. 2002; 22 pages.*
Leland Vane; "Membrane Technology"; POSS Nanotechnology Conference 2002; Sep. 2002; 13 pages.*
Jack Sammons; "Gas Permability & Gas Separation Using POSS Materials"; POSS Nanotechnology Conference 2002; Sep. 2002; 9 pages.*
Rene Gonzalez; "POSS Research Efforts within AFRL"; POSS Nanotechnology Conference 2002; Sep. 2002; 24 pages.*
Jeffrey Gilman; "Development of High Throughput Methods for Nanocomposite Materials Research"; POSS Nanotechnology Conference 2002; Sep. 2002; 24 pages.*
Andre Lee; "Applications of POSS in Thermosetting Polymers and Composites"; POSS Nanotechnology Conference 2002; Sep. 2002; 23 pages.*
M. Azam Ali et al.; "Nanocomposite Resists for NGL"; POSS Nanotechnology Conference 2002; Sep. 2002; 20 pages.*
Lucie Robitaille; "POSS NonoTechnology for Improved Adhesives in Telecommunications Applications"; POSS Nanotechnology Conference 2002; Sep. 2002; 18 pages.*
David A. Schiraldi; "Reinforcement of PET with POSS"; POSS Nanotechnology Conference 2002; Sep. 2002; 14 pages.*
Masanori Ikeda; "Utilization of POSS in Industrial Applications"; POSS Nanotechnology Conference 2002; Sep. 2002; 11 pages.*
Gregg Zank:: "The Chemistry of Hydrogen–octasilsesquioxane: The Preparation and Characterization of Octasilsesquioxane Containing Polymers"; POSS Nanotechnology Conference 2002; Sep. 2002; 18 pages.*
Richard Laine; "Silsesquioxane Nanocomposites and Phenylsilsesquioxane Derivatives"; POSS Nanotechnology Conference 2002; Sep. 2002; 19 pages.*
Bryan Coughlin; "POSS–Polyolefin Nanocomposites"; POSS Nanotechnology Conference 2002; Sep. 2002; 22 pages.*
Charles U. Pittman, Jr.; "Chemical Incorporation of POSS Derivatives into Crosslinked Polymer Matrices"; POSS Nanotechnology Conference 2002; Sep. 2002; 23 pages.*
Rusty Blanski; "The Synthesis and Characterization of Lubricants Based on POSS Technology"; POSS Nanotechnology Conference 2002; Sep. 2002; 19 pages.*
Mark Banasak–Holl; "POSS Surface Science and Applications to Non–Linear Electronic Devices"; POSS Nanotechnology Conference 2002; Sep. 2002; 20 pages.*
Scott Schricker; "POSS in Dental Composites and Adhesives"; POSS Nanotechnology Conference 2002; Sep. 2002; 19 pages.*
Patrick Mather; "Amphiphilic POSS Telechelics"; POSS Nanotechnology Conference 2002; Sep. 2002; 27 pages.*
Alan Esker; "Interfacial Properties of Amphiphilic POSS Derivatives"; POSS Nanotechnology Conference 2002; Sep. 2002; 15 pages.*
Adam Strachota; "POSS Reinforced Epoxy Systems"; POSS Nanotechnology Conference 2002; Sep. 2002.*
Richard Laine et al.; "Panel Discussion"; POSS Nanotechnology Conference 2002; Sep. 2002; 8 pages.*
European Patent Office; European Search Report; Feb. 23, 2005; 3 pages.*
MacFarlane; "How seawater, temperature, pressure degrade polymeric materials"; Materials Science/Engineering; Offshore—www.offshore–mag.com; Dec. 2002; 2 pages.*
Sanvito, G.; "Peroxide Vulcanised Perfluoroelastomers"; Macplas; 27; No. 235; Issn: 0394–3453; Jan./Feb. 2002; pp. 108–110.*
"Oilfield Engineering with Polymers Conference"; 4th MERL Conference, London, UK; Rapra Technology Ltd & MERL Limited; Nov. 3–4, 2003; pp. 248–258.*

* cited by examiner

Polysilane resins

Polycarbosilane resins

Polysilsesquioxane resins

PolyPOSS resins

DRILL BIT HAVING AN IMPROVED SEAL AND LUBRICATION METHOD USING SAME

Matter enclosed in heavy brackets [ ] appears in the original patent but forms no part of this reissue specification; matter printed in italics indicates the additions made by reissue.

TECHNICAL FIELD OF THE INVENTION

This invention relates, in general, to drill bits used for drilling a well that traverses a subterranean hydrocarbon bearing formation and, in particular, to an improved seal for a rotary drill bit than maintains lubricant within the drill bit and prevents the flow of drilling fluid into the bearing of the drill bit.

BACKGROUND OF THE INVENTION

Without limiting the scope of the present invention, its background will be described with reference to using rotary drill bits to drill a well that traverses a subterranean hydrocarbon bearing formation, as an example.

Rotary drill bits are commonly used to drill wells in the oil and gas well drilling industry as these rotary drill bit offers a satisfactory rate of penetration with a significant operational life in drilling most commonly encountered formations. Typically, a rotary drill bit includes a bit body having a threaded pin at its upper end adapted to be detachably secured to a drill string suspended from a drill rig. In addition, a rotary drill bit generally has a plurality of depending legs, typically three such legs, at the lower end of the body. The drill bit further includes a plurality of conical roller cutters having cutting elements thereon, with one roller cutter on each leg. Each leg typically includes a bearing for rotatably mounting each roller cutter thereon.

Sealed bearing type roller cutter bits further have a lubrication system including a reservoir holding a supply of lubricant. A passage in the bit body extends from the reservoir to the bearing to allow flow of lubricant to the bearing. A seal is disposed between the roller cutter and the bearing journal that holds lubricant in the bit. A diaphragm at the reservoir provides pressure compensation between the lubricant and the drilling fluid in the annulus between the bit and the wellbore.

In use, roller cutter drill bits are rotated in the wellbore on the end of a drill string that applies a relatively high downward force onto the drill bit. As the bits are rotated, the conical roller cutters rotate on the bearing journals thereby bringing the cutting elements on the roller cutters into engagement with the substrate at the bottom of the wellbore. The cutting elements drill through the substrate at the wellbore bottom by applying high point loads to the substrate to thereby cause the substrate to crack or fracture from the compression. A drilling fluid, commonly called drilling mud, passes under pressure from the surface through the drill string to the drill bit and is ejected from one or more nozzles adjacent to the roller cutters. The drilling fluid cools the drill bit and carries the cuttings up the wellbore annulus to the surface.

For cost-effective drilling, a worn drill bit needs to be replaced due to the reduced rate of drilling penetration for the worn bit. At a certain point, the cost of replacing the old drill bit with a new bit becomes equal to the cost of the drilling inefficiency, or in other words, the cost of the new bit plus the cost of rig time in tripping the drill string in and out of the wellbore is less than the cost of operating the worn bit. Unfortunately, once a drill bit is positioned in a wellbore, gathering reliable information regarding the operating condition, performance and remaining useful life of the drill bit becomes difficult. Typically, the decision by a drilling rig operator to replace a drill bit is a subjective one, based upon experience and general empirical data showing the performance of similar drill bits in drilling similar substrate formations. The rig operator's decision, however, as to when to replace a drill bit is often not the most cost effective because of the many factors affecting drilling performance beyond the condition and performance of the bit itself.

In addition, it is not uncommon for a drill bit to fail during the drilling operation. Bit failure may occur due to a variety of factors. For example, a bit may fail due to an improper application of the bit, such as by excessive weight on the drill bit from the drilling string, excessive rotational speed, using the wrong type of bit for substrate being drilled and the like. Regardless of the cause, the two most common types of bit failures are breakage of the cutting elements and bearing failure.

In the first mode, pieces of the cutting elements, which are typically either steel teeth or tungsten carbide inserts, are broken from the roller cutters. This breakage does not normally stop the drilling action but it does significantly reduce the rate of drilling penetration. In addition, the broken pieces are typically carried out of the wellbore by the circulating drilling fluid, thereby leaving the wellbore bottom clean for a replacement bit to continue extending the wellbore.

In the second mode of failure, once a bearing assembly has failed, continued use of the bit may result in the roller cutter separating from the bearing journal and remaining in the wellbore when the drill string is retrieved to the surface. The lost roller cutter must then be retrieved from the wellbore in a time-consuming and expensive fishing operation in which a special retrieval tool is tripped, in and out of the wellbore to retrieve the broken roller cutter.

In sealed bearing roller cutter bits, bearing failure is often the result of a seal failure that allows lubricant to flow out of the drill bit and drilling fluid, which contains abrasive particles, to flow into the bearing. Although less common, diaphragm failure has the same result as seal failure. In any event, bearing failure is almost always preceded by, or at least accompanied by, a loss of lubricant.

Therefore, a need has arisen for an improved seal for a sealed bearing roller cutter bit that can maintain the lubricant within the drill bit and prevent the flow of drilling fluid into the bearing. A need has also arisen for such a seal that has a high resistance to heat and abrasion, has a low coefficient of friction and does not significantly deform under load. Further, need has arisen for such a seal that is resistant to chemical interaction with hydrocarbons fluids encountered within the wellbore and that has a long useful life.

SUMMARY OF THE INVENTION

The present invention disclosed herein comprises a drill bit having an improved seal that can maintain the lubricant within the drill bit and prevent the flow of drilling fluid into the bearing. The seal of the present invention has a high resistance to heat and abrasion, has a low coefficient of friction and does not significantly deform under load. In addition, the seal of the present invention is resistant to chemical interaction with hydrocarbons fluids encountered within the wellbore and has a long useful life.

The drill bit of the present invention includes a drill bit body that is attached to a drill string at its upper end and has a plurality of journal pins on its lower end. Each of the journal pins has a bearing surface into which bearings are positioned. A rotary cutter is rotatably mounted on each journal pin. Each rotary cutter includes a bearing surface in a complementary relationship with the bearing surface of the respective journal pin such that the bearings maintain the rotary cutter and journal pin in the rotatable relationship relative to each other.

The drill bit body includes a pressure-compensated reservoir in fluid communication with the bearing surfaces of each journal pin and rotary cutter combination. The pressure-compensated reservoir has a lubricant therein that lubricates the bearings between the bearing surfaces. A diaphragm is positioned within the pressure-compensated reservoir. The diaphragm transmits pressure from the region surrounding the drill bit to the lubricant within the pressure-compensated reservoir. A seal element is positioned between each journal pin and rotary cutter. The seal elements retain the lubricant in the bearing surfaces and prevent fluids from exterior of the drill bit from entering the bearing surfaces. The seal elements may be any suitable seals including o-ring seals, d-seals, t-seals, v-seals, flat seals, lip seals and the like.

The diaphragm, the seal element or both may be constructed from a nanocomposite material including a polymer host material and a plurality of nanostructures. The polymer host material may be an elastomer such as nitrile butadiene (NBR) which is a copolymer of acrylonitrile and butadiene, carboxylated acrylonitrile butadiene (XNBR), hydrogenated acrylonitrile butadiene (HNBR) which is commonly referred to as highly saturated nitrile (HSN), carboxylated hydrogenated acrylonitrile butadiene, ethylene propylene (EPR), ethylene propylene diene (EPDM), tetrafluoroethylene and propylene (FEPM), fluorocarbon (FKM), perfluoroelastomer (FEKM) and the like.

The nanostructures of the nanocomposite may include nanoparticles having a scale in the range of approximately 0.1 nanometer to approximately 500 nanometers. The nanostructures may be formed from materials such as metal oxides, nanoclays, carbon nanostructures and the like. For example, the nanostructures may be formed from a silicon material such as polysilane resins, polycarbosilane resins, polysilsesquioxane resins and polyhedral oligomeric silsesquioxane resins. The polymer host material and the nanostructures may interact via interfacial interactions such as copolymerization, crystallization, van der Waals interactions and cross-linking interactions.

In another aspect, the present invention is directed to a method for lubricating a drill bit. The drill bit includes a drill bit body having at least one bearing and a rotary cutter rotatably attached to the drill bit body at the bearing, the method includes the steps of introducing a lubricant into a pressure-compensated reservoir in fluid communication with the bearing and retaining the lubricant within the drill bit with a seal element comprising a nanocomposite material including a polymer host material and a plurality of nanostructures.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
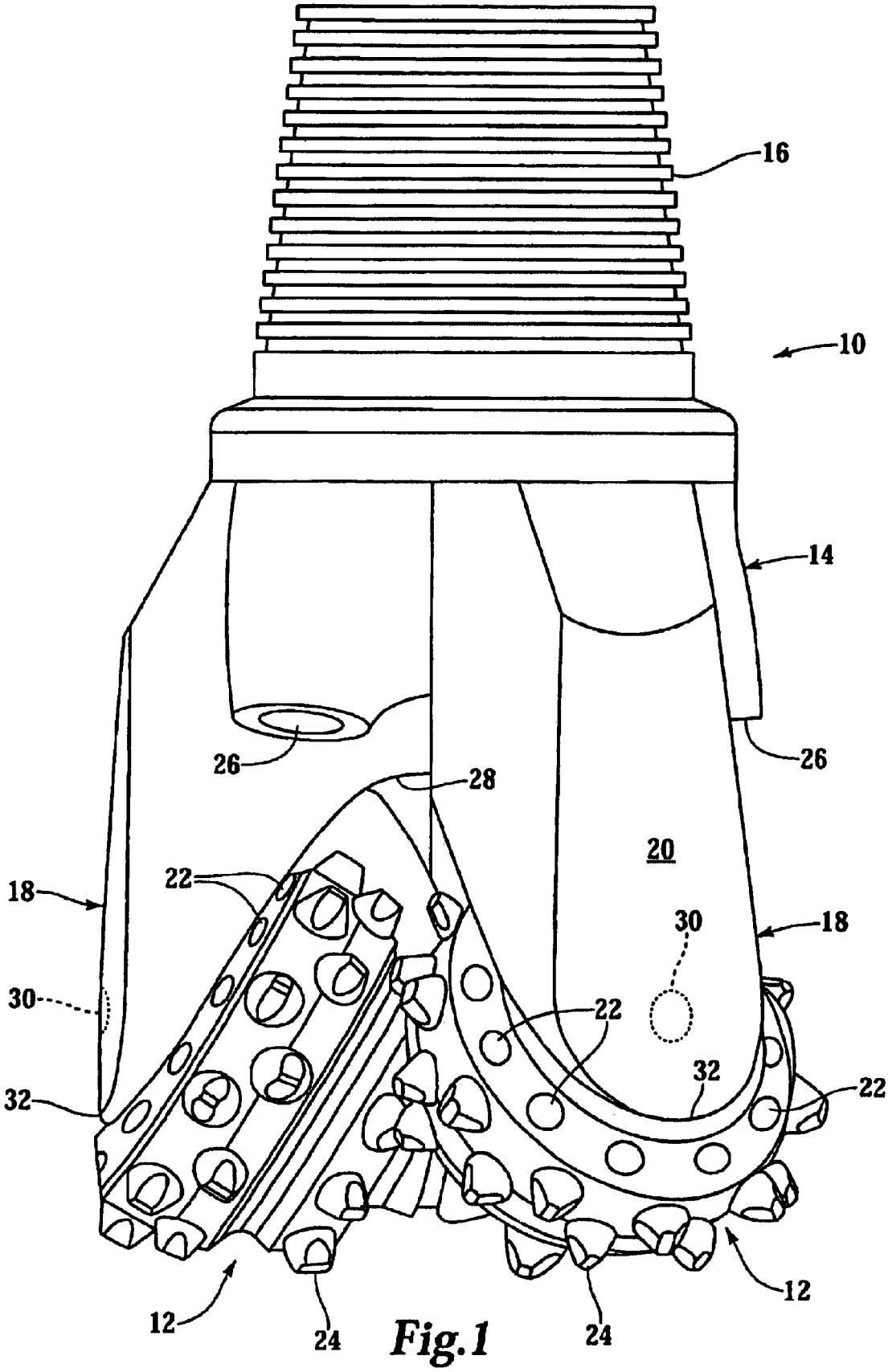
FIG. 1 is a schematic illustration of one type of rotary cone drill bit having improved seals in accordance with teachings of the present invention.

Referring initially to FIG. 1, therein is depicted a rotary cone drill bit of the type used in drilling a wellbore that traverses a subterranean hydrocarbon bearing formation that is schematically illustrated and generally designated 10. Rotary cone drill bit 10 includes a plurality of cone-shaped rotary cutter assemblies 12 that are rolled around the bottom of a wellbore by the rotation of a drill string attached to drill bit 10. Each rotary cutter assemblies 12 is rotatably mounted on a respective journal or spindle with a bearing system, sealing system and lubrication system disposed therebetween.

Drill bit 10, includes bit body 14 having a tapered, externally threaded upper portion 16 which is adapted to be secured to the lower end of a drill string. Depending from body 14 are three support arms 18, only two of which being visible in FIG. 1. Each support arm 18 preferably includes a spindle or journal formed integrally with the respective support arm 18. Each rotary cutter assembly 12 is rotatably mounted on a respective spindle. The spindles are preferably angled downwardly and inwardly with respect to bit body 14 and exterior surface 20 of the respective support arm 18 such that when drill bit 10 is rotated, rotary cutter assemblies 12 engage the bottom of the wellbore. For some applications, the spindles may also be tilted at an angle of zero to three or four degrees in the direction of rotation of drill bit 10.

Rotary cutter assemblies 12 may include surface compacts or inserts 22 pressed into respective gauge face surfaces and protruding inserts 24 or milled teeth, which scrape and gouge against the sides and bottom of the wellbore under the downhole force applied through the associated drill string. The borehole debris created by rotary cutter assemblies 12 is carried away from the bottom of the wellbore by drilling fluid flowing from nozzles 26 adjacent to lower portion 28 of bit body 14. The drilling fluid flow upwardly toward the surface through an annulus formed between drill bit 10 and the side wall of the wellbore.

Each rotary cutter assembly 12 is generally constructed and mounted on its associated journal or spindle in a substantially identical manner. Dotted circle 30 on exterior surface 20 of each support arm 18 represents an opening to an associated ball retainer passageway. The function of opening 30 and the associated ball retainer passageway will be discussed later with respect to rotatably mounting rotary cutter assemblies 12 on their respective spindle. Each support arm 18 includes a shirttail 32.

Figure 2:
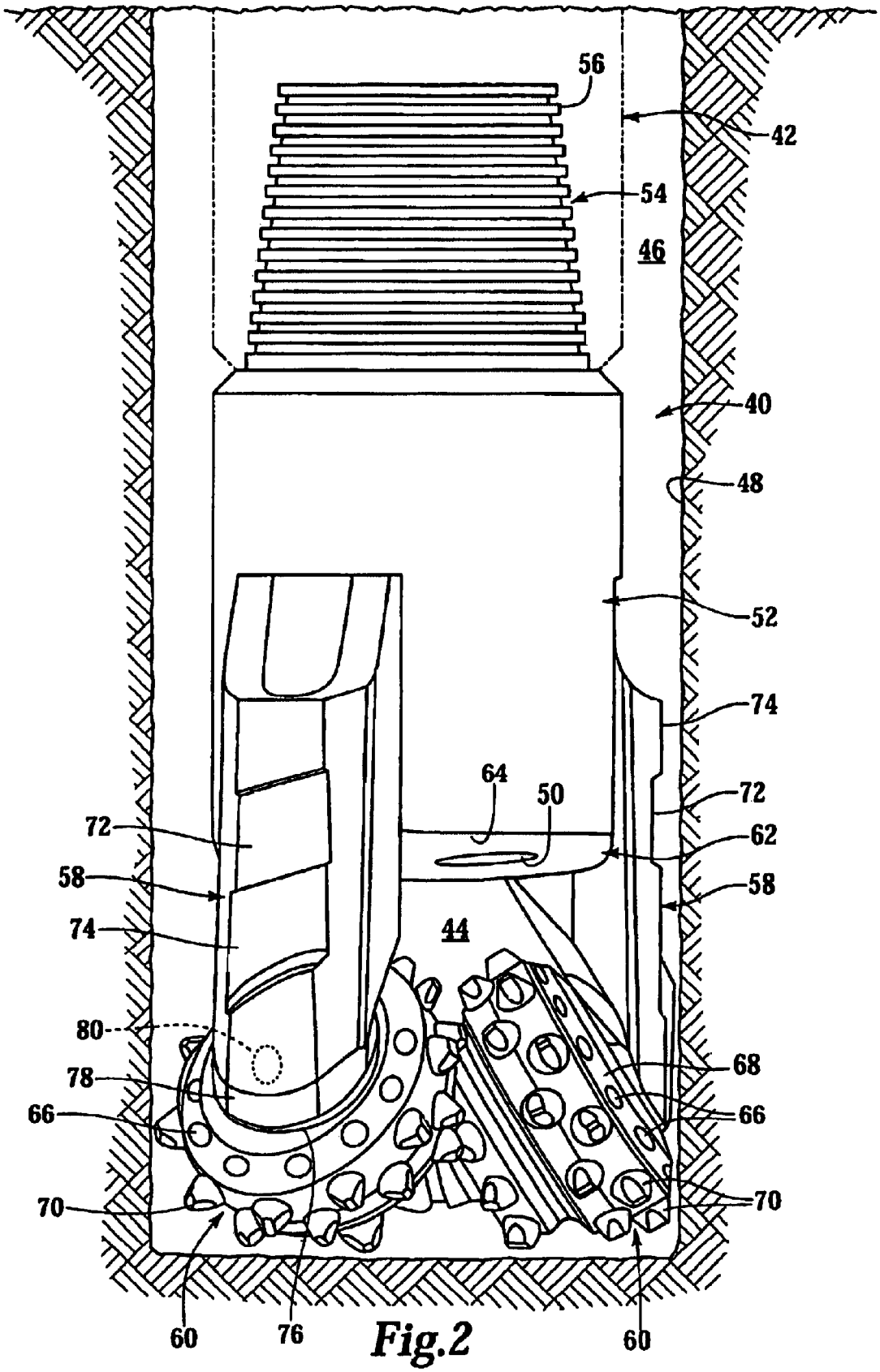
FIG. 2 is a schematic illustration of another type of rotary cone drill bit having improved seals in accordance with teachings of the present invention that is disposed in a wellbore.

Referring next to FIG. 2, therein is depicted a rotary cone drill bit that is generally designated 40. Drill bit 40 is attached to the lower end of a drill string 42 and is disposed in wellbore 44. An annulus 46 is formed between the exterior of drill string 42 and the wall 48 of wellbore 44. In addition to rotating drill bit 40, drill string 42 is used to provide a conduit for communicating drilling fluids and other fluids from the well surface to drill bit 40 at the bottom of wellbore 44. Such drilling fluids may be directed to flow from drill string 42 to multiple nozzles 50 provided in drill bit 40. Cuttings formed by drill bit 40 and any other debris at the bottom of wellbore 44 will mix with drilling fluids exiting from nozzles 50 and returned to the well surface via annulus 46.

In the illustrated embodiment, drill bit 40 includes a one piece or unitary body 52 with upper portion 54 having a threaded connection or pin 56 adapted to secure drill bit 40 with the lower end of drill string 42. Three support arms 58 are preferably attached to and extended longitudinally from bit body 52 opposite from pin 56, only two of which are visible in FIG. 2. Each support arm 58 preferably includes a respective rotary cutter assembly 60. Rotary cutter assemblies 60 extend generally downwardly and inwardly from respective support arms 58.

Bit body 52 includes lower portion 62 having a generally convex exterior surface 64 formed thereon. The dimensions of convex surface 64 and the location of rotary cutter assemblies 60 are selected to optimize fluid flow between lower portion 62 of bit body 52 and rotary cutter assemblies 60. The location of each rotary cutter assembly 60 relative to lower portion 62 may be varied by adjusting the length of support arms 58 and the spacing of support arms 58 on the exterior of bit body 52.

Rotary cutter assemblies 60 may further include a plurality of surface compacts 66 disposed in gauge face surface 68 of each rotary cutter assembly 60. Each rotary cutter assembly 60 may also include a number of projecting inserts 70. Surface compacts 66 and inserts 70 may be formed from various types of hard materials depending on anticipated downhole operating conditions. Alternatively, milled teeth may be formed as an integral part of each rotary cutter assembly 60.

Each support arm 58 also comprises a flow channel 72 to aid removal of cuttings and other debris from wellbore 44. Flow channels 72 are disposed on exterior surface 74 of support arm 58. Flow channels 72 may be formed in each support arm 58 by a machining operation. Flow channels 72 may also be formed during the process of forging the respective support arm 58. After support arms 58 have been forged, flow channels 72 may be further machined to define their desired configuration.

Each support arm 58 includes shirttail 76 with a layer of selected hardfacing materials covering shirttail portion 78. Alternatively, one or more compacts or inserts may be disposed within shirttail portions 78 to protect shirttail portions 78 from abrasion, erosion and wear. Dotted circle 80 on exterior surface 74 of each support arm 58 represents an opening to an associated ball retainer passageway.

Figure 3:
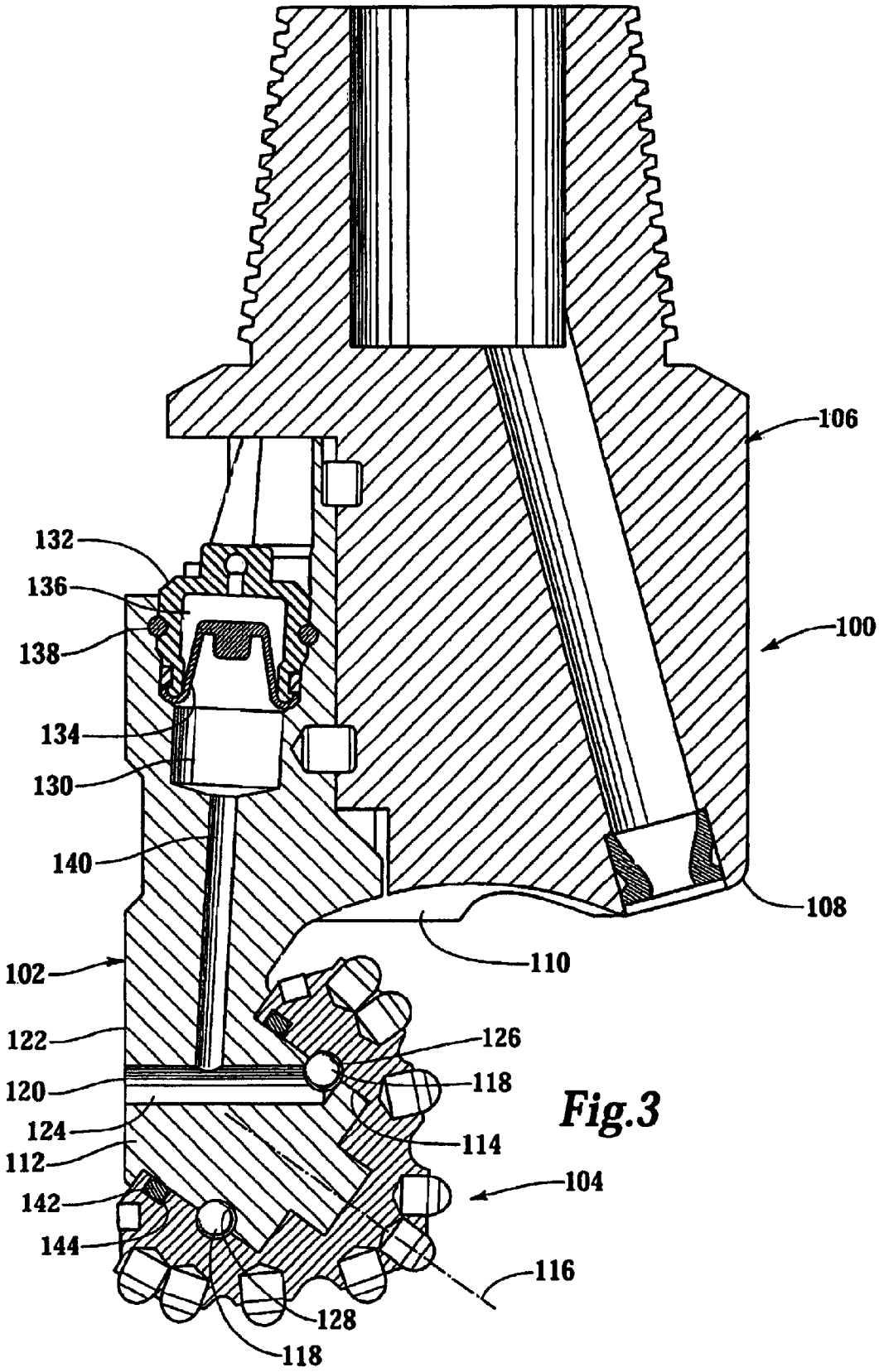
FIG. 3 is a cross sectional view with portions broken away of a drill bit having improved seals in accordance with teachings of the present invention.

Referring now to FIG. 3, therein is depicted a cross sectional view of a portion of a rotary cone drill bit that is generally designated 100. Drill bit 100 has support arms 102 and rotary cutter assemblies 104, only one of each being visible in FIG. 3. Drill bit 100 includes a one piece or unitary bit body 106 that is substantially similar to previously described bit body 52 except for lower portion 108 which has a generally concave exterior surface 110 formed thereon. The dimensions of concave surface 110 and the location of rotary cutter assemblies 104 may be selected to optimize fluid flow between lower portion 108 of bit body 106 and rotary cutter assemblies 104.

Rotary cutter assemblies 104 of drill bit 100 is mounted on a journal or spindle 112 projecting from respective support arms 102. In addition, a bearing system is used to rotatably mount rotary cutter assemblies 104 on respective support arms 102. More specifically, each rotary cutter assemblies 104 includes a generally cylindrical cavity 114 which has been sized to receive spindle or journal 112 therein. Each rotary cutter assemblies 104 and its respective spindle 112 have a common longitudinal axis 116 which also represents the axis of rotation for rotary cutter assemblies 104 relative to its associated spindle 112. Each rotary cutter assemblies 104 is retained on its respective journal 112 by a plurality of ball bearings 118. Ball bearings 118 are inserted through opening 120 in exterior surface 122 and ball retainer passageway 124 of the associated support arm 102. Ball races 126, 128 are formed respectively in the interior of cavity 114 of the associated rotary cutter assembly 104 and the exterior of journal 112.

Ball retainer passageway 124 is connected with ball races 126, 128, such that ball bearings 118 may be inserted therethrough to form an annular array within ball races 126, 128 to prevent disengagement of rotary cutter assembly 104 from its associated journal 112. Ball retainer passageway 124 is subsequently plugged by inserting a ball plug retainer (not pictured) therein. A ball plug weld (not pictured) is preferably formed within each opening 120 to provide a fluid barrier between ball retainer passageway 124 and the exterior of each support arm 102 to prevent contamination and loss of lubricant from the associated sealed lubrication system.

Each support arm 102 preferably includes lubricant cavity or lubricant reservoir 130 having a generally cylindrical configuration. Lubricant cap 132 is disposed within one end of lubricant cavity 130 to prevent undesired fluid communication between lubricant cavity 130 and the exterior of support arm 102. Lubricant cap 132 includes a flexible, resilient diaphragm 134 that closes lubricant cavity 130. Cap 132 covers diaphragm 134 and defines a chamber 136 to provide a volume into which diaphragm 134 can expand. Cap 132 and diaphragm 134 are retained within lubricant cavity 130 by retainer 138.

A lubricant passage 140 extends through support arm 102 such that lubricant cavity 130 is in fluid communication with ball retainer passageway 124. Ball retainer passageway 124 provides fluid communication with internal cavity 114 of the associated rotary cutter assembly 104 and the bearing system disposed between the exterior of spindle 112 and the interior of cavity 114. Upon assembly of drill bit 100, lubricant passage 140, lubricant cavity 130, any available space in ball retainer passageway 124 and any available space between the interior surface of cavity 114 and the exterior of spindle 112 are filled with lubricant through an opening (not pictured) in each support arm 102. The opening is subsequently sealed after lubricant filling.

The pressure of the external fluids outside drill bit 100 may be transmitted to the lubricant contained in lubricant cavity 130 by diaphragm 134. The flexing of diaphragm 134 maintains the lubricant at a pressure generally equal to the pressure of external fluids outside drill bit 100. This pressure is transmitted through lubricant passage 140, ball retainer passageway 124 and internal cavity 114 to expose the inward face of seal element 142 to pressure generally equal to the pressure of the external fluids. More specifically, seal element 142 is positioned within a seal retaining groove 144 within cavity 114 to establish a fluid barrier between cavity 114 and journal 112. Seal element 142 may be an o-ring seal, a d-seal, a t-seal, a v-seal, a flat seal, a lip seal or the like and equivalents thereof that are suitable for establishing the required fluid barrier between cavity 114 and journal 112. In addition, more than one seal or a combination seal and backup ring may be positioned within one or more seal retaining grooves or otherwise between cavity 114 and journal 112.

As diaphragm 134 and seal element 142 must operate at the pressure and temperature conditions that prevail downhole, maintain lubricant within the drill bit, prevent the flow of drilling fluid into the bearing of the drill bit and have a long useful life, it is important that diaphragm 134 and seal, element 142 be resistant to hydrocarbons fluids and other chemical compositions found within oil wells and have high heat resistance. In addition, it is important that seal element 142 have high abrasion resistance, low rubbing friction and not readily deform under the pressure and temperature conditions in a well.

Diaphragm 134 and seal element 142 of the present invention are preferably formed from a polymeric material that, over a range of temperatures, is capable of recovering substantially in shape and size after removal of a deforming force, i.e., a polymeric material that exhibits certain physical and mechanical properties relative to elastic memory and elastic recovery. Accordingly, diaphragm 134 and seal element 142 of the present invention are preferably formed from an elastomeric material. In particular, seal element 142 of the present invention is preferably formed from an elastomeric material that is produced by a curing method that involves compounding or mixing the base polymer with various additive or agents such as graphite, a peroxide curing agent, furnace black, zinc oxide, magnesium oxide, antioxidants, accelerators, plasticizers, processing aids or the like and combinations thereof which modify various properties of the base polymer.

More specifically, seal element 142 may be formed from a nitrile elastomer such as nitrile butadiene (NBR) which is a copolymer of acrylonitrile and butadiene, carboxylated acrylonitrile butadiene (XNBR), hydrogenated acrylonitrile butadiene (HBR) which is commonly referred to as highly saturated nitrile (HSN), carboxylated hydrogenated acrylonitrile butadiene and the like. Seal, element 142 may also be formed from other elastomers such as ethylene propylene (EPR), ethylene propylene diene (EPDM), tetrafluoroethylene and propylene (FEPM), fluorocarbon (FKM), perfluoroelastomer (FEKM) or the like and equivalents thereof.

For example, the use of an HSN elastomer provides seal element 142 with the properties of elasticity, good chemical resistance, high mechanical strength and good resistance to abrasion at elevated temperatures as well as low coefficient of friction and excellent wear resistance. As compared with standard nitrile elastomers, HSN elastomers are hydrogenated to reduce the number of carbon-carbon double bonds. The hydrogenation process preferable eliminates between 96% and 99.5% of the double bonds in the nitrile. The removal of the carbon-carbon double bonds reduces the reaction of agents such as hydrocarbons, oxygen, hydrogen sulfide and ozone with the elastomer. Attack by such agents can reduce the tensile strength, elongation and compression set resistance of the elastomer composition.

While the additives listed above tend to improve certain properties when compounded or mixed with the base polymer of seal element 142, the improvement in one property tends to be counteracted by a reduction in the performance envelope of another property. For example, compounding the base polymer with an additive may result in an increase in the temperature stability of the base polymer but may also result in a reduction in the abrasion resistance of the base polymer or vice versa.

Figure 4:
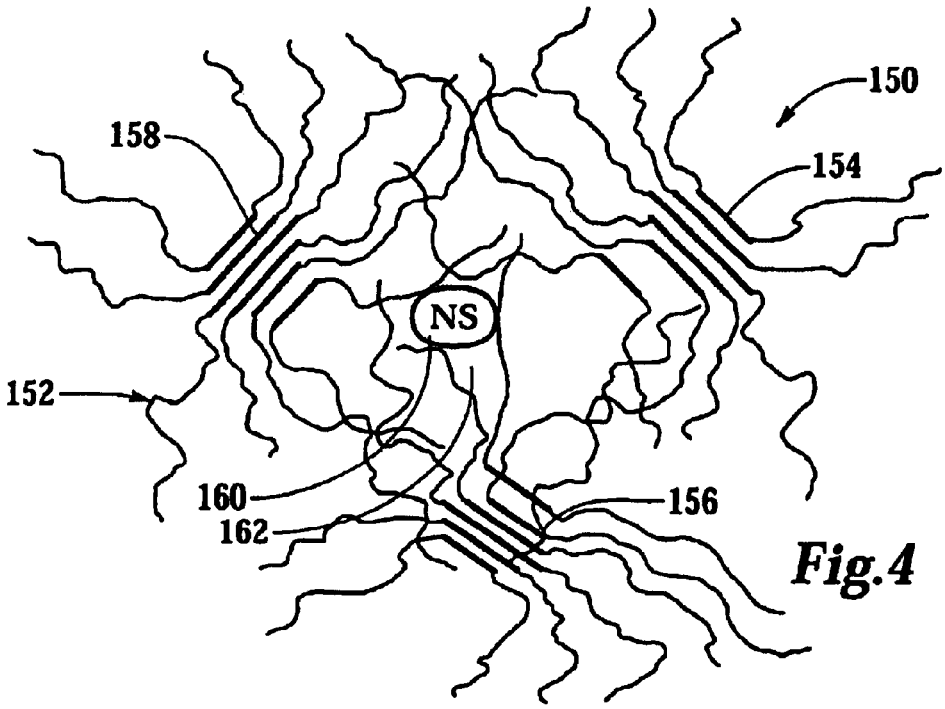
FIG. 4 is a nanoscopic view of a nanocomposite material including a polymer host material and a nanostructure used in improved seals for a drill bit in accordance with teachings of the present invention.

Seal element 142 of the present invention, however, overcomes these property trade off problems by integrating nanomaterials into the base polymer either instead of or in addition to other additives. As seen in FIG. 4, a nanocomposite material forming a diaphragm or a seal element of the present invention is nanoscopically depicted and generally designated 150. Nanocomposite material 150 includes a polymer host material 152 includes multiple polymers, such as polymers 154, 156, 158 and a plurality of nanostructures such as the depicted nanostructure 160. Polymer host material 152 exhibits microporocity as represented by a plurality of regions of free volume, such as region 162. In the illustrated embodiment, nanostructure 160 is positioned within free volume region 162.

Nanostructure 160 structurally and chemically complements the microporocity of polymer host material 152. More specifically, as nanostructure 160 has a greater surface area than polymer host material 152, due to the nano-size and nano-volume of nanostructure 160, nanostructure 160 is integrated with polymer host material 152 and forms interfacial interactions with polymer host material 152 at region 162. The interfacial interactions, including copolymerization, crystallization, van der Waals interactions and cross-linking interactions, are formed between nanostructure 160 and multiple polymers 154, 156, 158 to not only improve the tensile strength, compression set and temperature stability of polymer host material 152, but also the extrusion resistance, explosive decompression resistance and abrasion resistance of host polymer material 152, thereby resulting in an extended life for the diaphragms and seal elements of the present invention.

Preferably, nanostructure 160 is integrated with polymer host material 152 prior to curing. In one embodiment, nanostructure 160 is integrated into polymer host material 152 by adding or blending nanostructure 160 in a preceramic state with polymer host material 152 such that when nanostructure 160 is heated above its decomposition point, nanostructure 160 converts into a ceramic. Alternatively, nanostructure 160 may be integrated with polymer host material 152 after curing using a deposition process such as spraying.

Nanostructure 160 comprises nanoparticles having a scale in the range of approximately 0.1 nanometers to approximately 500 nanometers. Nanostructure 160 may be formed by a process including sol-gel synthesis, inert gas condensation, mechanical alloying, high-energy ball milling, plasma synthesis, electrodeposition or the like. Nanostructure 160 may include metal oxides, nanoclays, carbon nanostuctures and the like.

Metal oxide nanoparticles include oxides of zinc, iron, titanium, magnesium, silicon, aluminum, cerium, zirconium or the like and equivalents thereof, as well as mixed metal compounds such as indium-tin and the like. In one embodiment, a plasma process is utilized to form metal oxide nanoparticles having a narrow size distributions, nonporous structures and nearly spherical shapes. Nanoclays are naturally occurring, plate-like clay particles such as montmorillonite (MMT) nanoclay. In one embodiment, the nanoclays are exfoliated in the polymer host via a plastic extrusion process. Carbon nanostuctures include carbon nanotubes, carbon nanofibers (CNF), nanocarbon blacks and calcium carbonates.

Figure 5:
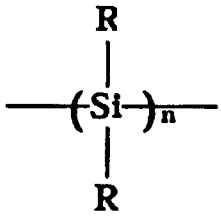
FIG. 5 depicts the structural formula of one embodiment of a silicon-based nanostructure used in improved seals for a drill bit in accordance with teachings of the present invention.
Figure 6:
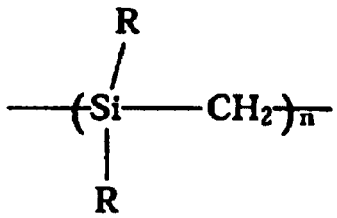
FIG. 6 depicts the structural formula of a second embodiment of a silicon-based nanostructure used in improved seals for a drill bit in accordance with teachings of the present invention.
Figure 7:
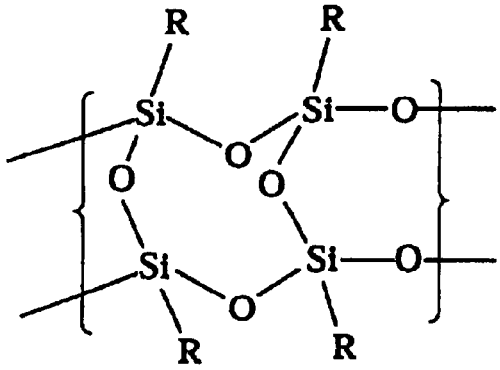
FIG. 7 depicts the structural formula of a third embodiment of a silicon-based nanostructure used in improved seals for a drill bit in accordance with teachings of the present invention.
Figure 8:
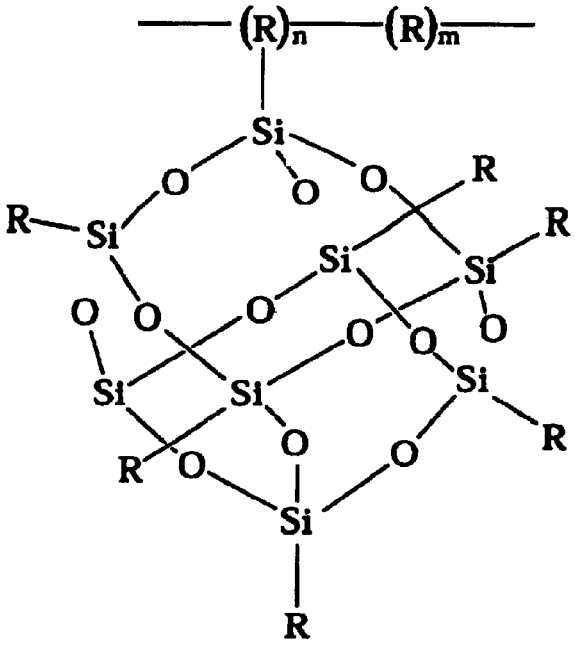
FIG. 8 depicts the structural formula of a fourth embodiment of a silicon-based nanostructure used in improved seals for a drill bit in accordance with teachings of the present invention.

In one embodiment, nanostructure 160 may be formed from polysilane resins (PS), as depicted in FIG. 5, polycarbosilane resins (PCS), as depicted in FIG. 6, polysilsequioxane resins (PSS), as depicted in FIG. 7, or polyhedral oligomeric silsesquioxane resins (POSS), as depicted in FIG. 8, as well as monomers, polymers and copolymers thereof or the like and equivalents thereof. In the formulas presented in FIGS. 5–8, R represent a hydrogen or an alkane, alkenyl or alkynl hydrocarbons, cyclic or linear, with 1–28 carbon atoms, substituted hydrocarbons R—X, aromatics Ar and substituted aromatics Ar—X where X represents halogen, phosphorus or nitrogen containing groups. The incorporation of halogen or other inorganic groups such as phosphates and amines directly into onto these nanoparticles can afford additional improvements to the mechanical properties of the material. For example, the incorporation of halogen group can afford additional heat resistance to the material. These nanostructures may also include termination points, i.e., chain ends, that contain reactive or nonreactive functionalities such as silanols, esters, alcohols, amines or R groups.

Figure 9:
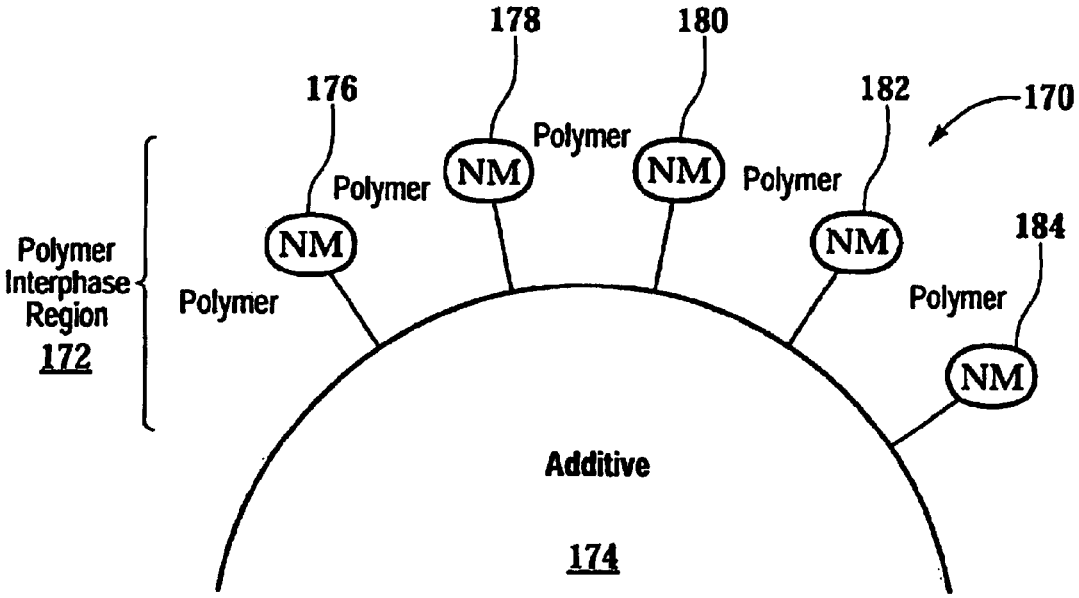
FIG. 9 is a nanoscopic view of a nanocomposite material including a polymer host material, a plurality of nanostructures and an additive used in improved seals for a drill bit in accordance with teachings of the present invention.

Referring next to FIG. 9, a nanocomposite material for use in a seal element of the present invention is nanoscopically depicted and generally designated 170. As described above, one or more additives may be compounded or mixed with the base polymer of the seal element to modify and enhance desirable seal properties. Use of nanostructures in combination with these additives can further enhance desirable seal properties. As illustrated, a polymer interphase region 172 is defined by polymer host material. An additive 174 is associated with polymer interphase region 172. Nanostructures 176–184 stabilize and reinforce interphase region 172 of nanocomposite 170 and, in particular, nanostructures 176–184 reinforce the polymers and complement additive 174 by strengthening the bonding between the polymers and additive 174.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A drill bit for drilling a wellbore, the drill bit comprising:

a drill bit body having at least one bearing;

a rotary cutter rotatably attached to the drill bit body at the bearing; and a seal element positioned between the drill bit body and the rotary cutter, the seal element comprising a nanocomposite material including a polymer host material and a plurality of nanostructures selected from the group consisting of polysilane resins, polycarbosilane resins, polysilsesquioxane resins [and], polyhedral oligomeric silsesquioxane resins, *monomers, polymers and copolymers of any of these resins, and any of the preceding nanostructures further containing termination points*.

2. The drill bit as recited in claim 1 wherein the seal element is selected from the group consisting of o-ring seals, d-seals, t-seals, v-seals, flat seals and lip seals.

3. The drill bit as recited in claim 1 wherein the polymer host material further comprises an elastomer.

4. The drill bit as recited in claim 3 wherein the elastomer is selected from the group consisting of nitrile butadiene, carboxylated acrylonitrile butadiene, hydrogenated acrylonitrile butadiene, highly saturated nitrile, carboxylated hydrogenated acrylonitrile butadiene, ethylene propylene, ethylene propylene diene, tetrafluoroethylene and propylene, fluorocarbon and perfluoroelastomer.

5. The drill bit as recited in claim 1 wherein the nanostructures further comprise nanoparticles having a scale in the range of approximately 0.1 nanometer to approximately 500 nanometers.

6. The drill bit as recited claim 1 wherein the nanostructures further comprise a material selected from the group consisting of metal oxides, nanoclays and carbon nanostructures.

7. The drill as recited in claim 1 wherein the nanostructures further comprise silicon.

8. The drill bit as recited in claim 1 wherein the polymer host material and the nanostuctures have interfacial interactions selected from the group consisting of copolymerization, crystallization, van der Waals interactions and cross-linking interactions.

9. A drill bit for drilling a wellbore, the drill bit comprising;

a drill bit body including a coupling that attaches to a drill string and a plurality of journal pins, each having a bearing surface;

a rotary cutter rotatably mounted on each journal pin, each rotary cutter including a bearing surface;

a pressure-compensated reservoir in fluid communication with the bearing surfaces having a lubricant therein; and a seal element positioned between each journal pin and rotary cutter, the seal elements retaining the lubricant in the bearing surfaces, the seal elements comprising a nanocomposite material including a polymer host material and a plurality of nanostuctures selected from the group consisting of polysilane resins, polycarbosilane resins, polysilsesquioxane resins [and], polyhedral oligomeric silsesquioxane resins, *monomers, polymers and copolymers of any of these resins, and any of the preceding nanostructures that also contain termination points*.

10. The drill bit as recited in claim 9 further comprising a diaphragm positioned within the pressure-compensated reservoir, the diaphragm comprising a nanocomposite material including a polymer host material and a plurality of nanostuctures.

11. The drill bit as recited in claim 9 wherein the seal element is selected from the group consisting of o-ring seals, d-seals, t-seals, v-seals, flat seals and lip seals.

12. The drill bit as recited in claim 9 wherein the polymer host material further comprises an elastomer.

13. The drill bit as recited in claim 12 wherein the elastomer is selected from the group consisting of nitrile butadiene, carboxylated acrylonitrile butadiene, hydrogenated acrylonitrile butadiene, highly saturated nitrile, carboxylated hydrogenated acrylonitrile butadiene, ethylene propylene, ethylene propylene diene, tetrafluoroethylene and propylene, fluorocarbon and perfluoroelastomer.

14. The drill bit as recited in claim 9 wherein the nanostructures further comprise nanoparticles having a scale in the range of approximately 0.1 nanometer to approximately 500 nanometers.

15. The drill bit as recited in claim 9 wherein the nanostructures further comprise a material selected from the group consisting of metal oxides, nanoclays and carbon nanostuctures.

16. The drill bit is recited in claim 9 wherein the nanostructures further comprise silicon.

17. The drill bit as recited in claim 9 wherein the polymer host material and the nanostructures have interfacial interactions selected from the group consisting of copolymerization, crystallization, van der Waals interactions and cross-linking interactions.

18. The drill bit as recited in claim 9 wherein the nanostructures further comprise carbon.

19. A drill bit for drilling a wellbore, the drill bit comprising:

a drill bit body including a coupling that attaches to a drill string and a plurality of journal pins, each having a bearing surface;

a rotary cutter rotatably mounted on each journal pin, each rotary cutter including a bearing surface;

a pressure-compensated reservoir in fluid communication with the bearing surfaces having a lubricant therein;

a diaphragm positioned within the pressure-compensated reservoir, the diaphragm comprising a nanocomposite material including a polymer host material and a plurality of nanostructures selected from the group consisting of polysilane resins, polycarbosilane resins, polysilsesquioxane resins [and], polyhedral oligomeric silsesquioxane resins, *monomers, polymers and copolymers of any of these resins, and any of the preceding nanostructures that also contain termination points*; and a seal element positioned between each journal pin and rotary cutter, the seal elements retaining the lubricant in the bearing surfaces.

20. The drill bit as recited in claim 19 wherein the seal element comprising a nanocomposite material including a polymer host material and a plurality of nanostructures.

21. The drill bit as recited in claim 20 wherein the seal element is selected from the group consisting of o-ring seals, d-seals, t-seals, v-seals, flat seals and lip seals.

22. The drill bit as recited in claim 19 wherein the polymer host material further comprises an elastomer.

23. The drill bit as recited in claim 22 wherein the elastomer is selected from the group consisting of nitrile butadiene, carboxylated acrylonitrile butadiene, hydrogenated acrylonitrile butadiene, highly saturated nitrile, carboxylated hydrogenated acrylonitrile butadiene, ethylene propylene, ethylene propylene diene, tetrafluoroethylene and propylene, fluorocarbon and perfluoroelastomer.

24. The drill bit as recited in claim 19 wherein the nanostructures further comprise nanoparticles having a scale in the range of approximately 0.1 nanometer to approximately 500 nanometers.

25. The drill bit as recited in claim 19 wherein the nanostructures further comprise a material selected from the group consisting of metal oxides, nanoclays and carbon nanostructures.

26. The drill bit as recited in claim 19 wherein the nanostructures further comprise silicon.

27. The drill bit as recited in claim 19 wherein the polymer host material and the nanostructures have interfacial interactions selected from the group consisting of copolymerization, crystallization, van der Waals interactions and cross-linking interactions.

28. A method for lubricating a drill bit for drilling a wellbore, the drill bit including a drill bit body having at least one bearing and a rotary cutter rotatably attached to the drill bit body at the bearing, the method comprising the steps of:

introducing a lubricant into a pressure-compensated reservoir in fluid communication with the bearing; and retaining the lubricant within the drill bit with a seal element comprising a nanocomposite material including a polymer host material and a plurality of nanostructures selected from the group consisting of polysilane resins, polycarbosilane resins, polysilsesquioxane resins [and], polyhedral oligomeric silsesquioxane resins, *monomers, polymers and copolymers of any of these resins, and any of the preceding nanostructures that also contain termination points*.

29. The method as recited in claim 28 further comprising the step of applying pressure from the exterior of the drill bit on the lubricant with a diaphragm comprising a nanocomposite material including a polymer host material and a plurality of nanostructures.

30. The method as recited in claim 28 wherein the step of retaining the lubricant within the drill bit with a seal element further comprises retaining the lubricant within the drill bit with a seal element selected from the group consisting of o-ring seals, d-seals, t-seals, v-seals, flat seals and lip seals.

31. The method as recited in claim 28 wherein the step of retaining the lubricant within the drill bit with a seal element further comprises selecting the polymer host material from the group consisting of elastomers.

32. The method as recited in claim 28 wherein the step of retaining the lubricant within the drill bit with a seal element further comprises selecting the polymer host material from the group consisting of nitrile butadiene, carboxylated acrylonitrile butadiene, hydrogenated acrylonitrile butadiene, highly saturated nitrile, carboxylated hydrogenated acrylonitrile butadiene, ethylene propylene, ethylene propylene diene, tetrafluoroethylene and propylene, fluorocarbon and perfluoroelastomer.

33. The method as recited in claim 28 wherein the step of retaining the lubricant within the drill bit with a seal element further comprises selecting the nanostructures from nanomaterials having a scale in the range of approximately 0.1 nanometer to approximately 500 nanometers.

34. The method as recited in claim 28 wherein the step of retaining the lubricant within the drill bit with a seal element further comprises selecting the nanostructures from the group consisting of metal oxides, nanoclays and carbon nanostructures.

35. The method as recited in claim 28 wherein the step of retaining the lubricant within the drill bit with a seal element further comprises selecting the nanostructures from the group consisting of silicon based nanomaterials.

* * * * *

UNITED STATES PATENT AND TRADEMARK OFFICE

CERTIFICATE OF CORRECTION

PATENT NO. : RE 40,197 E
APPLICATION NO. : 11/701948
DATED : January 4, 2008
INVENTOR(S) : Thomas Wayne Ray It is certified that error appears in the above-identified patent and that said Letters Patent is hereby corrected as shown below:

Column 1, line 9 insert the following:

--Notice: More than one reissue application has been filed for the reissue of patent 7013998. The reissue applications are 12/069159 which is a continuation of 11/701948 PAT RE40197 which is a REI of 10/717742 PAT 7013998.--

Signed and Sealed this

Nineteenth Day of May, 2009

John Doll

JOHN DOLL
*Acting Director of the United States Patent and Trademark Office*

UNITED STATES PATENT AND TRADEMARK OFFICE

CERTIFICATE OF CORRECTION

PATENT NO. : RE 40,197 E
APPLICATION NO. : 11/701948
DATED : April 1, 2008
INVENTOR(S) : Thomas Wayne Ray It is certified that error appears in the above-identified patent and that said Letters Patent is hereby corrected as shown below:

Column 1, line 9 insert the following:

--Notice: More than one reissue application has been filed for the reissue of patent 7013998. The reissue applications are 12/069159 which is a continuation of 11/701948 PAT RE40197 which is a REI of 10/717742 PAT 7013998.--

This certificate supersedes the Certificate of Correction issued May 19, 2009.

Signed and Sealed this

Ninth Day of June, 2009

John Doll

JOHN DOLL
*Acting Director of the United States Patent and Trademark Office*